United States Patent
Larkins et al.

(10) Patent No.: US 9,891,130 B2
(45) Date of Patent: Feb. 13, 2018

(54) SYSTEM AND METHOD FOR TESTING SEAT PRESSURE SENSOR

(71) Applicant: Ford Global Technologies, LLC, Dearborn, MI (US)

(72) Inventors: Jon Larkins, Temperance, MI (US); William Jerome Olsen, Farmington Hills, MI (US); Keith Richard Warner, Allen Park, MI (US); Ryan Ritter, Canton, MI (US)

(73) Assignee: FORD GLOBAL TECHNOLOGIES, LLC, Dearborn, MA (US)

( * ) Notice: Subject to any disclaimer, the term of this patent is extended or adjusted under 35 U.S.C. 154(b) by 216 days.

(21) Appl. No.: 14/734,116

(22) Filed: Jun. 9, 2015

(65) Prior Publication Data
US 2016/0363501 A1 Dec. 15, 2016

(51) Int. Cl.
| | | |
|---|---|---|
| G01L 27/00 | (2006.01) | |
| B60N 2/00 | (2006.01) | |
| G01G 19/44 | (2006.01) | |
| G01G 19/52 | (2006.01) | |
| G01L 7/02 | (2006.01) | |
| G01M 99/00 | (2011.01) | |
| G01L 1/02 | (2006.01) | |

(52) U.S. Cl.
CPC ............ *G01L 27/005* (2013.01); *B60N 2/002* (2013.01); *G01G 19/44* (2013.01); *G01G 19/52* (2013.01); *G01L 1/02* (2013.01); *G01L 7/022* (2013.01); *G01M 99/008* (2013.01)

(58) Field of Classification Search
CPC ....... G01L 27/005; G01L 7/022; G01G 19/44; G01G 19/52; B60N 2/002
USPC .................................................. 73/1.57, 1.59
See application file for complete search history.

(56) References Cited

U.S. PATENT DOCUMENTS

| | | | | |
|---|---|---|---|---|
| 5,753,834 A | * | 5/1998 | Stewart | G01M 99/001 73/865.3 |
| 6,253,133 B1 | * | 6/2001 | Sakai | B60R 21/01532 180/268 |
| 6,479,766 B2 | * | 11/2002 | Gray | B60N 2/002 177/144 |

(Continued)

OTHER PUBLICATIONS

Kosiak et al., "Future trends in restraint systems electronics", Delphi Automotive Systems, SAE Brazil 1999.

*Primary Examiner* — Peter Macchiarolo
*Assistant Examiner* — Alexander Mercado
(74) *Attorney, Agent, or Firm* — Frank A. MacKenzie; Bejin Bieneman PLC (57) ABSTRACT

A system for testing a pressure sensor of a seat includes a loading device and a processor. The loading device removably applies weight to the seat. The processor receives a measurement of a pre-installation pressure offset of a bladder of the pressure sensor measured before installation of the pressure sensing assembly into the seat. The processor is programmed to receive a weighted measurement from the pressure sensor in the seat when the loading device applies weight to the seat and an empty seat measurement from the pressure sensor in the seat when the loading device does not apply weight to the seat. The processor determines a threshold value by subtracting the empty seat measurement from the weighted measurement. The processor determines a seat pressure offset value by subtracting the pre-installation pressure offset value from the threshold value. The processor compares the seat pressure offset value to a selected range.

7 Claims, 5 Drawing Sheets

(56) References Cited

U.S. PATENT DOCUMENTS

| | | | | |
|---|---|---|---|---|
| 6,539,771 B1* | 4/2003 | Davidson | G01G 19/4142 | 73/1.13 |
| 6,609,054 B2* | 8/2003 | Wallace | G06K 9/00362 | 180/271 |
| 6,629,445 B2* | 10/2003 | Yamanaka | B60R 21/01516 | 73/1.13 |
| 6,643,575 B2* | 11/2003 | Ishida | B60N 2/002 | 180/273 |
| 6,771,175 B1* | 8/2004 | Eagle | B60R 21/01516 | 280/733 |
| 6,818,842 B2* | 11/2004 | Gray | B60N 2/002 | 177/144 |
| 6,832,503 B2* | 12/2004 | Marentic | G01G 19/4142 | 73/1.08 |
| 6,851,296 B2* | 2/2005 | Seifert | B60N 2/002 | 73/1.13 |
| 6,927,678 B2* | 8/2005 | Fultz | B60N 2/002 | 280/734 |
| 7,046,158 B2* | 5/2006 | Saunders | G01G 19/4142 | 180/271 |
| 7,120,527 B2* | 10/2006 | Prieto | B60R 21/01556 | 180/273 |
| 7,363,184 B2* | 4/2008 | Hibner | G01G 19/4142 | 177/136 |
| 7,542,836 B1* | 6/2009 | Norton | B60R 21/01532 | 280/728.1 |
| 7,574,892 B2* | 8/2009 | Fischer | B60R 21/01556 | 73/1.08 |
| 2002/0027345 A1* | 3/2002 | Aoki | B60R 21/01546 | 280/735 |
| 2002/0043789 A1* | 4/2002 | Lichtinger | B60N 2/002 | 280/735 |
| 2002/0066302 A1* | 6/2002 | Hamm | G01G 19/4142 | 73/1.13 |
| 2007/0061102 A1* | 3/2007 | Kim | B60R 21/01516 | 702/173 |
| 2007/0132220 A1* | 6/2007 | Breed | B60R 21/01516 | 280/735 |
| 2007/0135982 A1* | 6/2007 | Breed | B60J 10/00 | 701/36 |
| 2007/0299586 A1* | 12/2007 | Griffin | B60R 21/01516 | 701/45 |

* cited by examiner

SYSTEM AND METHOD FOR TESTING SEAT PRESSURE SENSOR

BACKGROUND

A vehicle may include an airbag system that deploys airbags during an impact of the vehicle to absorb energy from the occupant. These airbags can include front airbags, side curtain airbags, etc. The deployment of any one of the airbags may be dependent upon the size and weight of the occupant. The vehicle may include technology to determine the size and weight of occupants to determine the deployment modes of the various airbags.

For example, the airbag system may include a front passenger airbag that is deployable from an instrument panel of the vehicle in front of a passenger of a front passenger seat, e.g., during a front impact of the vehicle. The airbag system may be designed such that the front passenger airbag is deployed at a force and in a direction designed to impact an adult seated in the front passenger seat. However, this force and direction of deployment may not be designed to impact a child seated in the front passenger seat. In this situation, it may be desirable to deactivate the front passenger airbag when a child is seated in the front passenger seat such that the front passenger airbag does not deploy in the event of a vehicle impact.

The front passenger seat may include a feature designed to identify an occupant of the front passenger seat as an adult or a child. For example, the feature may identify the occupant based on the weight of the occupant. In this scenario, the feature may include a pressure sensing assembly that provides a signal to the airbag system whether the pressure of the occupant applied over a pattern on the seat cushion exceeds a threshold value or is below a threshold value. When the pressure measurement exceeds the threshold value, the occupant is identified as an adult and the front passenger airbag is activated for deployment in the event of an impact. When the pressure measurement is below the threshold value, the occupant is identified as a child and the front passenger airbag is deactivated.

Various factors in the manufacturing and assembly of the seat may affect the measurements of the pressure sensor. For example, manufacturing of the pressure sensing assembly may lead to variation in different pressure measurements. In addition, variation in the components of the seat, e.g., foam, fabric/leather covering, etc. may lead to variation in pressure measurements when the pressure sensing assembly is installed in the seat. For example, conditions such as temperature variation, humidity variation, mold changes, etc., may lead to variation in the foam. Assembly conditions, such as differences in stitching or trim pattern may lead to additional variation. In light of these factors that can contribute to variation in measurements from the pressure sensor, there remains an opportunity to design a system and method for testing the pressure sensor after installation into the rest of the seat to reduce the likelihood of false identification of mis-built seats.

DETAILED DESCRIPTION

Figure 3:
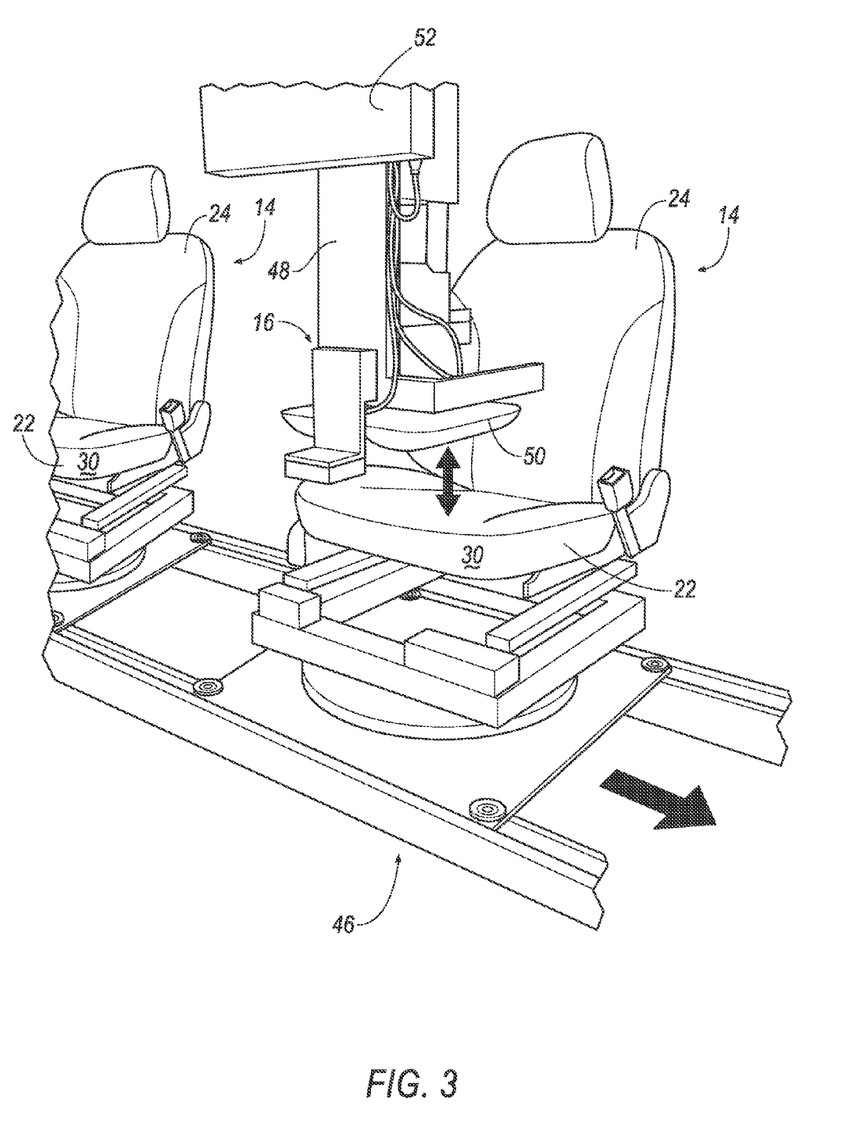
FIG. 3 is a perspective view of a plurality of seats on a conveyor at an assembly facility of the seats.
Figure 4:
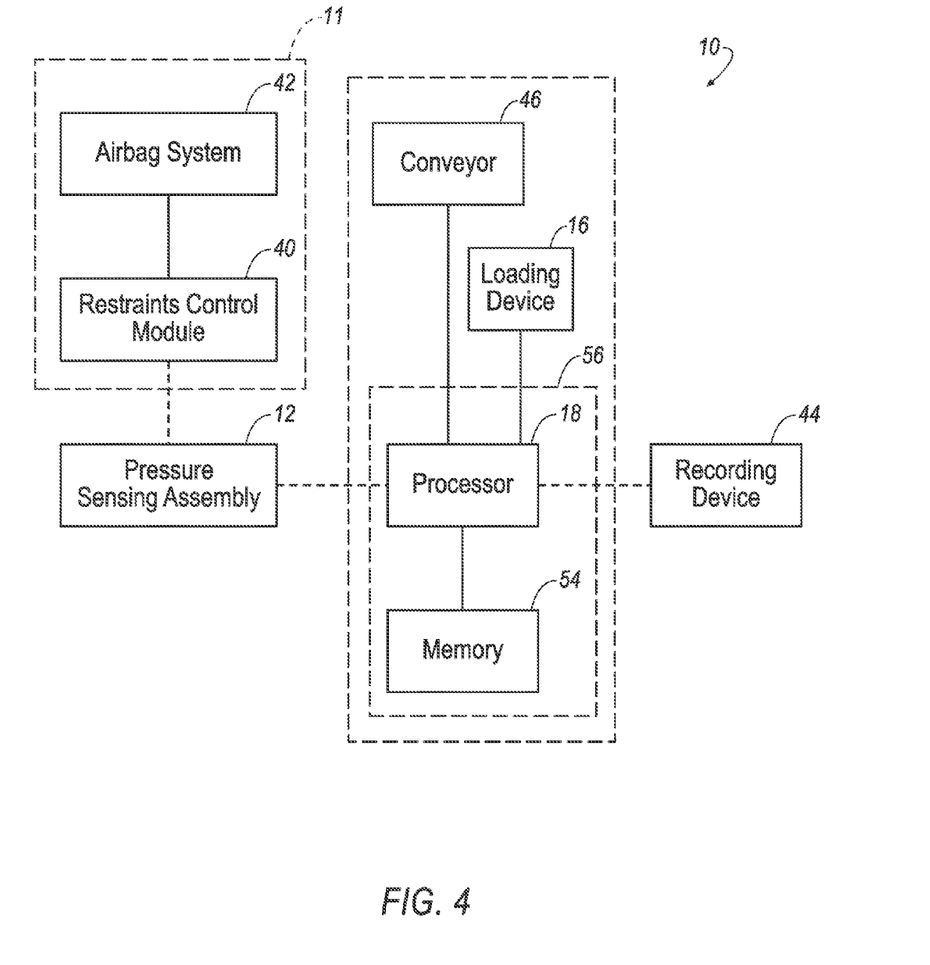
FIG. 4 is a schematic of a system for testing the pressure sensing assembly with the system communicating a recording device at an assembly facility of the pressure sensor, and with the pressure sensor being connectable to a restraints control module and airbag system of the vehicle.

With reference to the Figures, wherein like numerals indicate like parts throughout the several views, a system 10 for testing a pressure sensing assembly 12 of a seat 14 of a vehicle 11 (not shown) includes a loading device 16, shown in FIG. 3, and a processor 18, shown schematically in FIG. 4. The loading device 16 is configured to apply weight to the seat 14, and the processor 18 is in communication with the loading device 16 and is configured to be in communication with pressure sensing assembly 12. The processor 18 is programmed to receive a measurement of a pre-installation pressure offset of a pressure sensing assembly 12 measured before installation of the pressure sensing assembly 12 into the seat 14. The processor 18 is programmed to program an empty seat measurement and a threshold value into the pressure sensing assembly 12, e.g., a pressure sensor 32, in the seat 14. A weighted measurement is measured when the loading device 16 applies weight to the seat 14 and the empty seat measurement is measured when the loading device 16 does not apply weight to the seat 14.

The processor 18 is programmed to determine the threshold value by subtracting the empty seat measurement from the weighted measurement. The processor 18 is also programmed to determine a seat pressure offset value by subtracting the pre-installation pressure offset from the threshold value. By identifying whether a tested seat 14 has a seat pressure offset value within a selected range, the system 10 identifies seats 14 that are acceptable, i.e., are properly manufactured and assembled, and identifies seats 14 that are unacceptable, i.e., are improperly manufactured and/or assembled, otherwise known as "mis-builds." As set forth further below, since the seat pressure offset value is based on both a measurement of the pressure sensing assembly 12 before installation into the seat 14, i.e., the pre-installation pressure offset measurement, and measurements of the pressure sensing assembly 12 after installation into the seat 14, i.e., the threshold value, the system 10 accounts for variation in the pressure sensing assembly 12 itself as well as other components of the seat 14.

Seats 14 that are identified by the system 10 as having a seat pressure offset value in the selected range are moved on for ultimate assembly into a vehicle 11. Seats 14 identified by the system 10 as having a seat pressure offset value outside the selected range are scrapped or re-worked to address any issue that negatively impacted the seat pressure offset value. In addition, when a seat 14 is identified as having a seat pressure offset value outside the selected range, this seat 14 may be inspected in an attempt to determine the cause of the mis-build in the manufacturing and/or assembly of the seat 14 and this cause may be addressed with a change to the manufacturing and/or assembly process.

Figure 1:
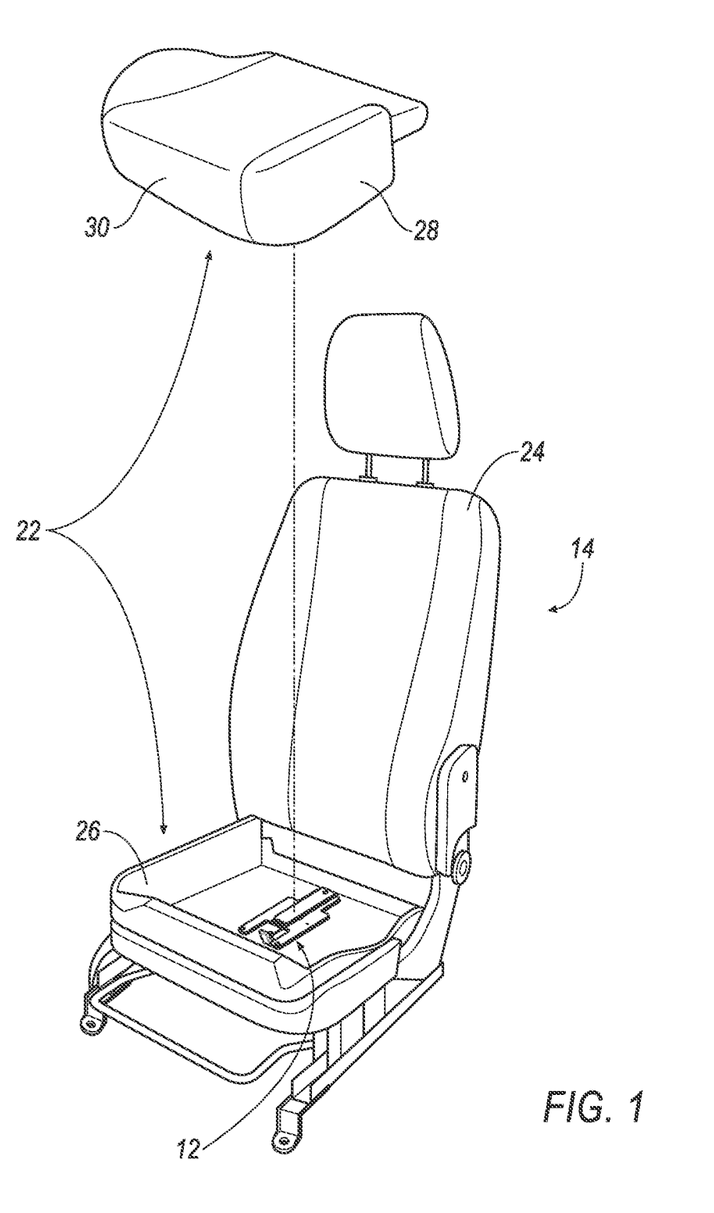
FIG. 1 is a partially exploded view of a seat for a vehicle including a pressure sensor disposed between the cushion foam and cushion assembly.

With reference to FIG. 1, the seat 14 may include a seat bottom 22 and a seat back 24 extending generally vertically from the seat bottom 22. The seat 14 may be, for example, a front passenger seat of the vehicle 11. The seat bottom 22 includes the pressure sensing assembly 12, i.e., the pressure sensing assembly 12 is a component of the seat bottom 22.

With continued reference to FIG. 1, the seat bottom 22 includes a frame 26 and a cushion assembly 28 mounted to the frame 26. The pressure sensing assembly 12 may be supported on the frame 26 and may be mounted to the frame 26. The pressure sensing assembly 12 may be, for example, disposed between the frame 26 and the cushion assembly 28. Alternatively, the pressure sensing assembly 12 may be disposed in the cushion assembly 28. The cushion assembly 28 may include foam (not shown) and a cover 30 disposed over the foam. The cover 30 may be, for example, leather, vinyl, cloth, etc.

Figure 2:
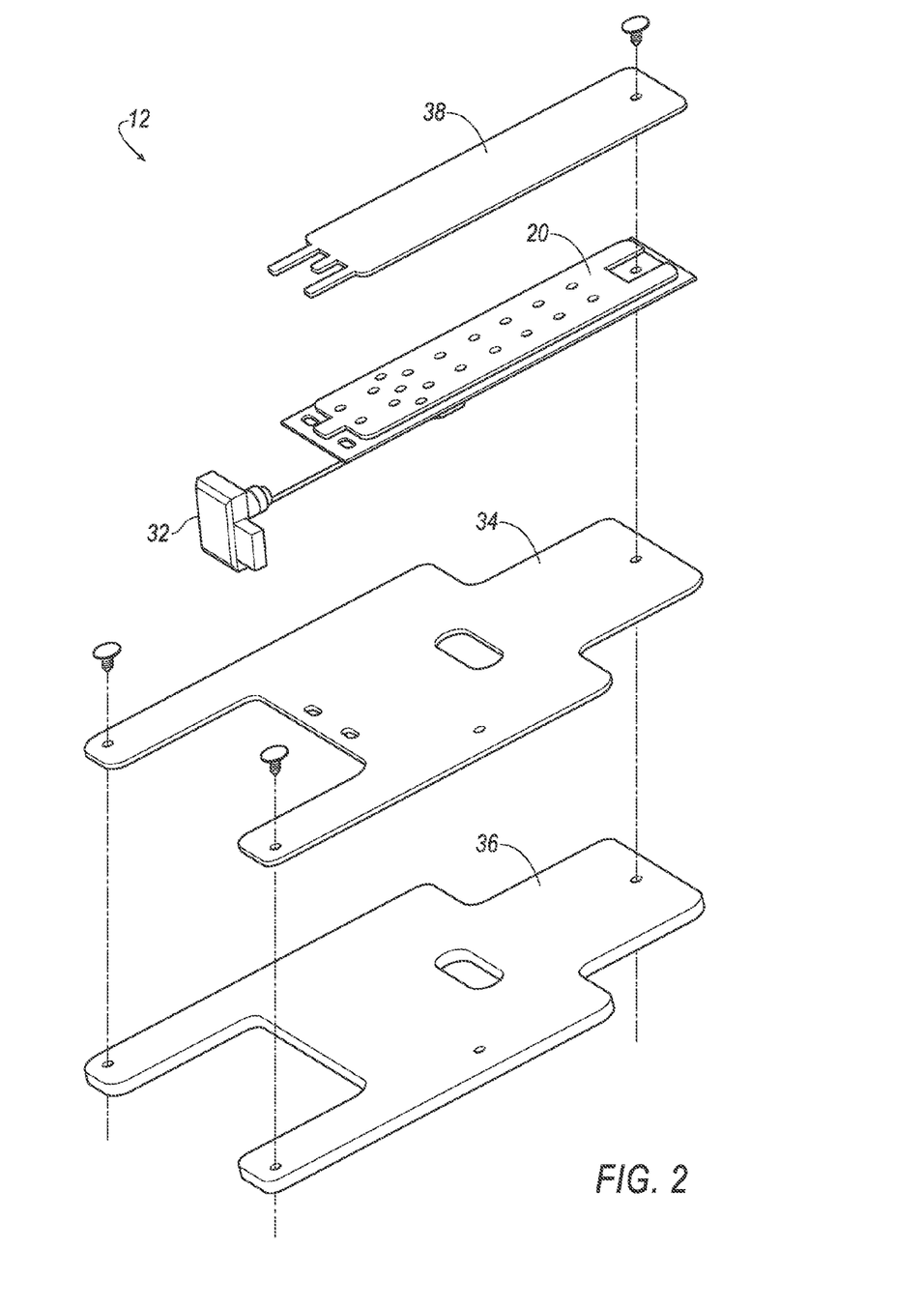
FIG. 2 is an exploded view of the pressure sensing assembly.

With reference to FIG. 2, a pressure sensing assembly 12 may include a pressure sensor 32 in fluid communication with a bladder 20. The bladder 20 may be sealed and may enclose a fluid in communication with the pressure sensor 32. The pressure sensor nit 32 measures the pressure of the bladder 20. Specifically, the pressure sensor 32 may measure the pressure of the bladder 20 continuously or periodically. The pressure sensor 32 may be digital. The pressure sensor 32, or any other component of pressure sensing assembly 12, may include memory and may be programmable with settings, e.g., the threshold value as set forth below, and may sense, process, and/or send pressure measurements, as set forth further below. The pressure sensing assembly 12 may, alternatively, be of any suitable configuration. As shown in FIG. 2, a pressure sensing assembly 12 may include a backer board 34 for mounting to the frame 26, felt 36 disposed between the backer board 34 and the frame 26, and a covering 38 over the bladder 20.

Pressure applied to the bladder 20, e.g., from an occupant of the seat 14 sitting on the cushion assembly 28, increases the pressure in the bladder 20. When the seat 14 is installed in a vehicle 11, the pressure sensing assembly 12, and more specifically the pressure sensor 32, is in communication with an electronic component of the vehicle 11, e.g., a restraints control module 40 of the vehicle 11, to communicate pressure measurements to the electronic component. FIG. 4, for example, schematically shows the pressure sensing assembly 12 being connectable (as identified by the dotted line) to the restraints control module 40.

Specifically, the pressure sensing assembly 12, e.g., the pressure sensor 32, may be programmed with a threshold value, as set forth further below. When the pressure sensor 32 measures a pressure measurement in the bladder 20 above the threshold value, the pressure sensor 32 communicates to the electronic component, e.g., the restraints control module 40, that the occupant is identified as adult. When the pressure sensor 32 measures a pressure measurement in the bladder 20 below the threshold value, the pressure sensor 32 communicates to the electronic component, e.g., the restraints control module 40, that the occupant is identified as child. The pressure sensor 32 may identify that the occupant is a child or an adult, based on the pressure measurement of the bladder 20 relative to the threshold value, and may communicate this identification to the electronic component, e.g., the restraints control module 40. Alternatively, the pressure sensor 32 may communicate the pressure measurement of the bladder 20 to the electronic component, e.g., the restraints control module 40, and the electronic component may identify the occupant as a child or an adult.

The electronic component, e.g., the restraints control module 40, may be in communication with an airbag system 42 (schematically shown in FIG. 4) of the vehicle 11 that deploys airbags (not shown) during an impact of the vehicle 11 to absorb energy from the occupant. For example, the airbag system 42 may include a front passenger airbag that is deployable from an instrument panel of the vehicle 11 in front of a passenger of the front passenger seat 14, e.g., during a front impact of the vehicle 11. When the pressure measurement from the pressure sensor 32 is below the threshold value, the occupant is identified as a child and the front passenger airbag may be deactivated by the restraints control module 40. When the pressure measurement from the pressure sensor 32 is above the threshold value, the occupant is identified as an adult and the front passenger airbag may be activated for deployment in the event of an impact of the vehicle 11 by the restraints control module 40.

As set forth above, the processor 18 is programmed to receive a measurement of a pre-installation pressure offset of the bladder 20 of a pressure sensing assembly 12 measured before installation of pressure sensing assembly 12 into the seat 14. The pre-installation pressure offset may be measured, for example, at the assembly facility (not shown) for the pressure sensing assembly 12, which may be different than the assembly facility (not shown) for the seat 14. In any event, the pre-installation pressure offset is measured before the pressure sensing assembly 12 is assembled to the rest of the seat 14. The pre-installation pressure offset may be measured by connecting the pressure sensor 32 to a recording device 44, e.g., a computer, at the assembly facility for a pressure sensing assembly 12 and loading a weight of predetermined magnitude on the bladder 20. The pre-installation pressure offset is recorded by the recording device 44. In the alternative, or in addition, the pressure sensor 32 may record the pre-installation pressure offset. The processor 18 is programmed to receive the pre-installation pressure offset from the pressure sensor 32, i.e., when the processor 18 is in communication with the pressure sensor 32, and/or from the recording device 44 at the assembly facility for pressure sensing assembly 12, as identified with the dotted line between the recording device 44 and the processor 18 in FIG. 4.

With reference to FIG. 3, the loading device 16 may be disposed along a conveyor 46, e.g., of an assembly line at the assembly facility for the seat 14. A plurality of seats 14 may be assembled on the conveyor 46. The conveyor 46 may move each seat 14 below the loading device 16. The loading device 16 may include a vertically moveable arm 48 supporting a weight 50. When one of the seats 14 is disposed below the weight 50, the arm 48 may be lowered onto the cushion assembly 28, i.e., applies weight 50 to the seat 14. The arm 48 may be subsequently raised to allow the conveyor 46 to move another seat 14 below the arm 48.

The processor 18 of the system 10 is in communication with the pressure sensor 32 when the weight 50 is applied to the seat 14, as shown by the dotted line between the processor 18 and the pressure sensing assembly 12 in FIG. 4. For example, when the conveyor 46 moves the seat 14 below the loading device 16, as shown in FIG. 3, a cord (not shown) may removably connect the processor 18 to a port on the seat 14 that is connected to pressure sensing assembly 12. The processor 18 may be a component of a computing device 56 that includes a memory 54, the memory 54 including one or more forms of computer-readable media, and storing instructions executable by the processor 18 for performing various operations, including as disclosed herein.

As set forth above, the processor 18 is programmed to program the empty seat measurement and the threshold value into the pressure sensor 32 in the seat 14. The empty seat measurement may be measured before or after the weighted measurement. After the weighted measurement and recorded, and the empty seat measurement and calculated seat pressure offset and programmed by the processor 18, the conveyor 46 may move the next seat 14 below the loading device 16 for measurement.

The first step of determining the seat pressure offset value is subtracting the empty seat measurement from the weighted measurement. The pre-installation pressure offset is then subtracted from the threshold value to determine the seat pressure offset value. The processor 18 is configured to identify the seat 14 as being unacceptable when the seat pressure offset value is outside of the selected range and to identify the seat 14 as being acceptable when the seat pressure offset value is inside the selected range. The acceptable/unacceptable identification takes into consideration variation in the manufacturing and/or assembly process of the rest of the seat 14, e.g., the cushion assembly 28 and/or the frame 26. This is due to the use of both the pre-installation pressure offset, taken after assembly of pressure sensing assembly 12 and before assembly of pressure sensing assembly 12 into the rest of the seat 14, as well as the weighted and unweighted measurements from a pressure sensing assembly 12 taken after assembly of the pressure sensing assembly 12 into the rest of the seat 14.

The processor 18 may be programmed with the selected range for the seat pressure offset value. The selected range may be based, for example, on historical data or any other suitable data. The processor 18 may be configured to choose the selected range based on the trim style of the seat 14. Specifically, a single vehicle model may include various trim styles. One or more of the various trim styles of the vehicle 11 may include seats 14 of different trim styles, including various shapes, materials, etc. The processor 18 may be programmed with a different selected range based on the trim style of the seat 14. The system 10 may identify the trim style of the seat 14 being measured in any suitable way.

As set forth above, the processor 18 determines the threshold value by subtracting the unweighted measurement from the weighted measurement. The processor 18 is configured to instruct the pressure sensor 32 to record the threshold value. As such, when the weight of the occupant on the seat 14 increases the pressure in the bladder 20 over the threshold value, the pressure sensing assembly 12 identifies the occupant as an adult and the front passenger airbag may be activated for deployment in the event of an impact of the vehicle 11 by the restraints control module 40. Conversely, if a weight of the occupant on the seat 14 does not increase the pressure in the bladder 20 over the threshold value, the pressure sensing assembly 12 identifies the occupant as a child and the front passenger airbag may be deactivated by the restraints control module 40.

Figure 5:
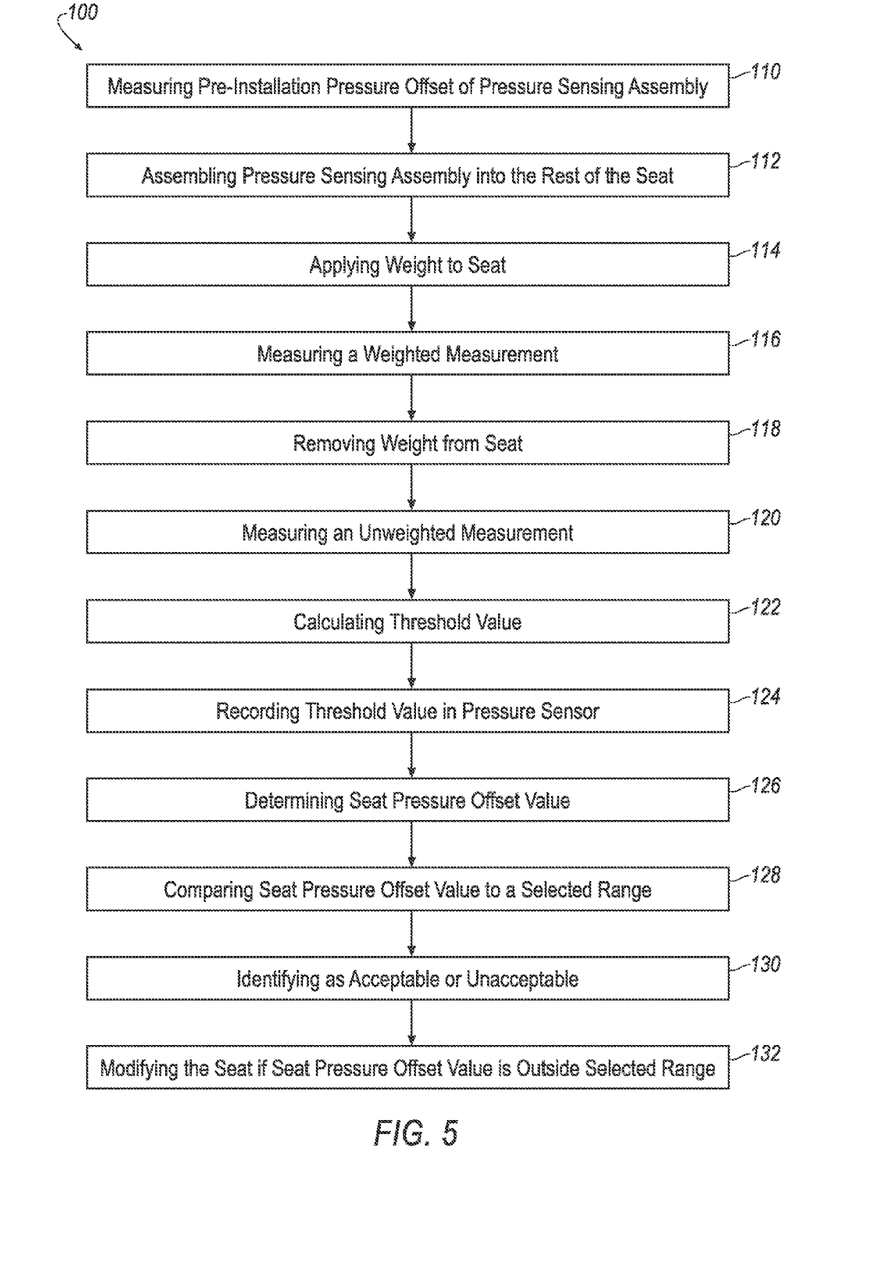
FIG. 5 is a flow chart of a method of testing the pressure sensor.

The method 100 of testing the pressure sensing assembly 12 is shown in FIG. 5. The method 100 of FIG. 5 is repeated for each seat 14 of the plurality of seats 14 that is passed down the conveyor 46 of FIG. 3.

As shown in block 110, the method 100 includes measuring the pre-installation pressure offset of the bladder 20 of each pressure sensor 12 before installation of the pressure sensing assembly 12 into the respective seat 14. As set forth above, the measurement of the pre-installation pressure offset may be taken at the assembly facility of the pressure sensing assembly 12 or at the assembly facility of the seat 14. In any event, the step of measuring the pre-installation pressure offset is performed before the pressure sensing assembly 12 is assembled into the seat 14.

As shown in block 112 of FIG. 5, the method next includes assembling the pressure sensing assembly 12 into the rest of the seat 14. This step is performed at the assembly facility for the seat 14. As set forth above, for example, pressure sensing assembly 12 may be mounted between the frame 26 and the cushion assembly 28.

The method 100 next may include applying weight to each seat 14, as shown in block 114 of FIG. 5. For example, the arm 48 may lower the weight 50 onto the cushion assembly 28. As shown in block 116, the method 100 includes measuring a weighted measurement with each pressure sensing assembly 12 in the respective seat 14 when the loading device 16 applies weight to the respective seat 14.

As shown in block 118, the method 100 includes removing the weight from the seat 14 and, as shown in block 120, the method 100 includes measuring an unweighted measurement with each pressure sensing assembly 12 in the respective seat 14 when the loading device 16 does not apply weight to the respective seat 14.

As shown in block 122, the method 100 includes calculating a threshold value by subtracting the unweighted measurement from the weighted measurement. The method may next include recording the threshold value in the respective pressure sensor 32, as shown in block 124.

The method next includes determining a seat pressure offset value by subtracting the pre-installation pressure offset from the threshold value for each seat 14, as shown in block 126 of FIG. 5. As shown in block 128, the method 100 includes comparing the seat pressure offset value of each seat 14 to the selected range. As shown in block 130, the method 100 includes identifying each seat 14 as being unacceptable when the seat pressure offset value is outside of the selected range or acceptable when the seat pressure offset value is inside the selected range. As set forth above, the selected range may be based on the trim style of the respective seat 14

As shown in block 132, the method 100 includes modifying each seat 14 having the seat pressure offset value outside of the selected range. Modifying each seat 14 may include scrapping the seat 14, e.g., discarding of the seat 14 so that the seat 14 cannot be assembled into a vehicle 11, or re-working the seat 14 so that the seat pressure offset value is inside the selected range upon further measurements.

The method may include calculating the selected range based on the seat pressure offset values calculated for previously measured seats 14. In other words, the selected range for the seat pressure offset values may be based on historical data. In addition, if a new trim style is designed for the seats 14, the method may include calculating a selected range for the new trim style of seats 14 based on the seat pressure offset values calculated for previously measured seats 14, i.e., historical data from existing trim styles.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method of testing a pressure sensing assembly of a plurality of seats, the method comprising:

measuring a pre-installation pressure offset of a bladder of each pressure sensing assembly before installation of the pressure sensing assembly into the respective seat;

applying weight to each seat;

measuring a weighted measurement with each pressure sensing assembly in the respective seat when the loading device applies weight to the respective seat;

measuring an empty seat measurement with each pressure sensing assembly in the respective seat when the loading device does not apply weight to the respective seat;

determining a seat pressure offset value by subtracting the pre-installation pressure offset and the empty seat measurement from the weighted measurement for each seat;

comparing the seat pressure offset value of each seat to a selected range; and modifying each seat having the seat pressure offset value outside of the selected range.

2. The method as set forth in claim 1 further comprising identifying each seat as being unacceptable when the seat pressure offset value is outside of the selected range or acceptable when the seat pressure offset value is inside the selected range.

3. The method as set forth in claim 1 wherein the selected range is based on the trim style of the respective seat.

4. The method as set forth in claim 1 further comprising calculating a threshold value by subtracting the empty seat measurement from the weighted measurement and recording the threshold value in the respective pressure sensing assembly.

5. The method as set forth in claim 1 wherein the processor is programmed to receive the pre-installation pressure offset from the pressure sensing assembly.

6. The method as set forth in claim 1 further comprising calculating the selected range based on the seat pressure offset values calculated for previously measured seats.

7. The method as set forth in claim 1 further comprising determining the selected range for a new trim style of seats based on the seat pressure offset values calculated for previously measured seats.

* * * * *